United States Patent [19]

Kawada et al.

[11] Patent Number: 4,538,084
[45] Date of Patent: Aug. 27, 1985

[54] STATOR OF MOTOR

[75] Inventors: Shigeki Kawada, Hino; Yoichi Amemiya; Masatoyo Sogabe, both of Hachioji; Noboru Iwamatsu, Hino, all of Japan

[73] Assignee: Fanuc Ltd., Tokyo, Japan

[21] Appl. No.: 604,354

[22] PCT Filed: Aug. 24, 1983

[86] PCT No.: PCT/JP83/00275
§ 371 Date: Apr. 20, 1984
§ 102(e) Date: Apr. 20, 1984

[87] PCT Pub. No.: WO84/01061
PCT Pub. Date: Mar. 15, 1984

[30] Foreign Application Priority Data

Aug. 26, 1982 [JP] Japan ................... 57-146797

[51] Int. Cl.³ ............................. H02K 1/06
[52] U.S. Cl. ................................ 310/217; 310/42; 310/64; 310/89; 310/91
[58] Field of Search .............. 310/42, 91, 90, 89, 310/254, 258, 259, 216, 217, 64; 336/234, 210

[56] References Cited

U.S. PATENT DOCUMENTS

| | | | |
|---|---|---|---|
| 1,156,639 | 10/1915 | Starker | 310/258 |
| 2,393,065 | 1/1946 | Rose | 310/258 |
| 2,460,063 | 1/1949 | Cole | 310/254 |
| 2,870,356 | 1/1959 | Gibson | 310/258 |
| 2,939,021 | 5/1960 | Gilchrist | 310/258 |
| 3,200,275 | 8/1965 | Lindgren | 310/258 |
| 3,253,171 | 5/1966 | Strock | 310/259 |

FOREIGN PATENT DOCUMENTS

| | | | |
|---|---|---|---|
| 1020099 | 11/1957 | Fed. Rep. of Germany | 310/258 |
| 2806971 | 8/1979 | Fed. Rep. of Germany | 310/258 |
| 0012671 | 6/1972 | Japan | 310/89 |
| 0064703 | 6/1979 | Japan | 310/216 |
| 0012754 | 1/1980 | Japan | 310/89 |
| 0060436 | 12/1947 | Netherlands | 310/258 |

Primary Examiner—R. Skudy
Attorney, Agent, or Firm—Armstrong, Nikaido, Marmelstein & Kubovcik

[57] ABSTRACT

Through holes (11, 12, 13 . . . ) are made at predetermined locations of a stator core (1). Reinforcing bars are inserted thereinto while fixed to the stator core by welding (81, 82, 83 . . . ). The stator core is supported between a front bracket (31) and a rear bracket (32) from both sides. Front side tap bolts (91, 92, 93 . . . ) and rear side tap bolts (61, 62, 63 . . . ) are engaged through the front bracket and the rear bracket with internal threads of both ends of the reinforcing bars, thereby fixing in place the stator core, front bracket, and rear bracket. By the foregoing structure, it is possible to improve the heat radiation action of a stator core, and also achieve a compacter motor.

4 Claims, 5 Drawing Figures

STATOR OF MOTOR

DESCRIPTION

1. Technical Field

The present invention relates to a stator of a motor, more particularly to a structure for fixing a stator core in a synchronous motor used as a servomotor.

2. Background of the Art

In a synchronous motor used as a servomotor, a stator is made of a stator core consisting of laminated magnetic steel sheets. The stator core is generally constructed to be accommodated in a casing. This construction obstructs heat radiation at the stator core portion. Also, it is not necessarily fully sufficient from the standpoint of compactness of the motor and reduction of manufacturing costs.

DISCLOSURE OF THE INVENTION

The object of the present invention is, in view of the aforementioned problems, to improve the heat radiation action of the stator core portion and also to reduce the size of the motor and cut manufacturing costs by the idea of using reinforcing bars inserted into through holes of the stator core and a tap bolt connected with the reinforcing bar.

In accordance with the present invention, there is provided a stator of a motor having a stator core comprising laminated magnetic core sheets, wherein through holes are provided at predetermined positions of said stator core, reinforcing bars are inserted into the through holes along with being fixed to said stator core by welding, said stator core is supported between a front bracket and a rear bracket, tap bolts are run through said front bracket and said rear bracket, and said tap bolts are engaged with internal threads provided at the ends of said reinforcing bars, thus fixing in position said stator core, said front bracket, and said rear bracket.

BEST MODE FOR CARRYING OUT THE INVENTION

Figure 1:
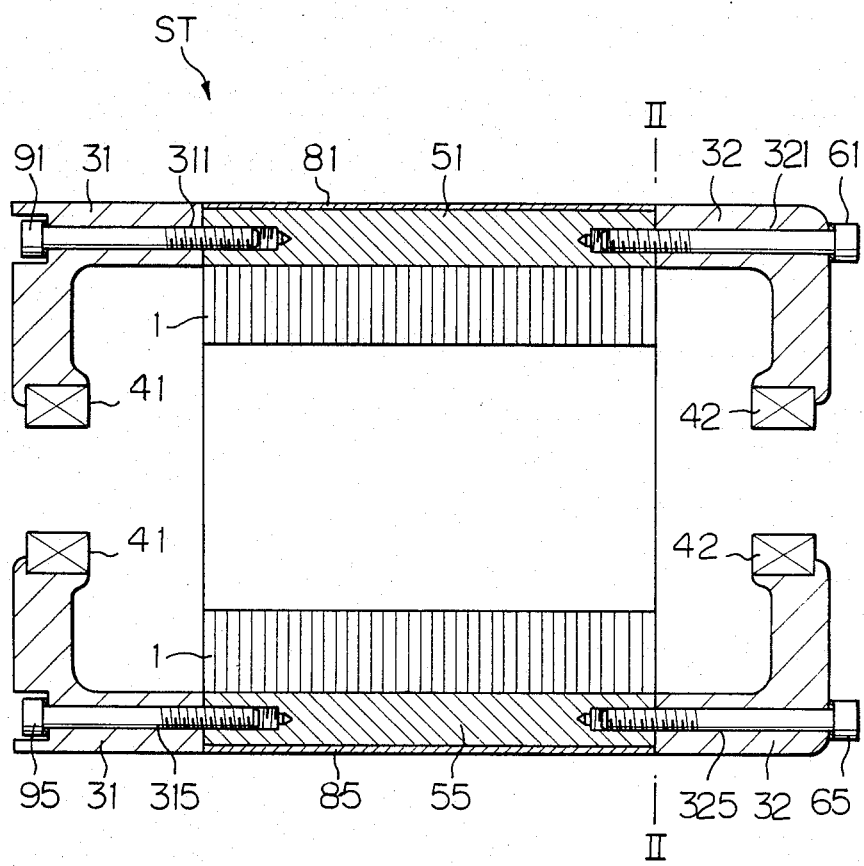
FIG. 1 is a cross-sectional view of a stator of a motor of a preferred embodiment according to the present invention.
Figure 2:
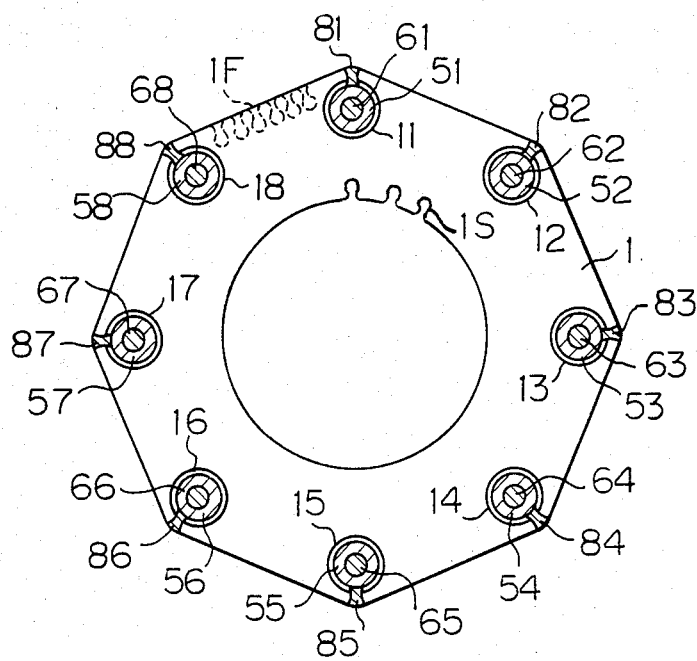
FIG. 2 is a cross-sectional view of FIG. 1 taken along the line II—II.
Figure 3:
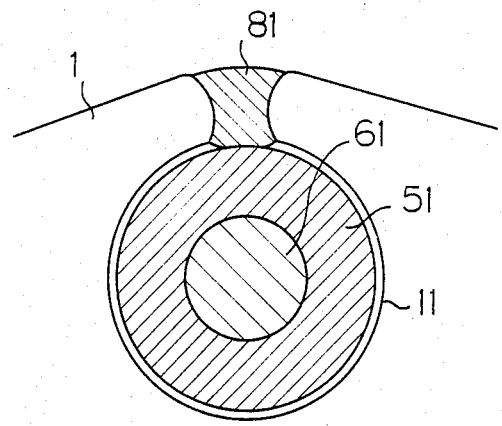
FIG. 3 is a partial enlarged view of FIG. 2.

A stator of a motor of an embodiment of the present invention is shown in FIG. 1. A cross-sectional view of FIG. 1 taken along the line II—II is shown in FIG. 2, and a partial enlarged view of FIG. 2 is shown in FIG. 3. The stator ST of the motor of FIG. 1 comprises: a stator core 1 consisting of laminated magnetic steel plates and having a slot 1S which accommodates the windings; a front bracket 31 and a rear bracket 32 which sandwich the stator core 1 from both sides; a bearing 41 mounted on the front bracket 31 for supporting a rotor shaft; and a bearing 42 mounted in the rear bracket 32 for supporting the rotor shaft.

In the stator ST of FIG. 1, a plurality of through holes 11, 12, 13 . . . are bored at selected portions (FIG. 2) of the stator core. Reinforcing bars 51, 52, 53 . . . are inserted into said through holes 11, 12, 13 . . . Coupling bolts 61, 62, 63 . . . of the rear bracket are screwed to internal threads of said reinforcing bars 51, 52, 53 . . . through through holes 321, 322, 323 . . . bored in the rear bracket 32, while coupling bolts 91, 92, 93 . . . of the front bracket are screwed to internal threads of the reinforcing bars 51, 52, 53 . . . through through holes 311, 312, 313 . . . bored in the front bracket 31. Thereafter, the stator core 1 is tightly fixed between the front bracket 31 and rear bracket 32.

In the selection of the position of the through holes in the stator core, it is possible to select various positions, but, as shown in FIG. 2, when through holes are formed by being cut in from outward at the circumference of the stator core, it is preferable to insert the reinforcing bars 51, 52, 53 . . . and then seal the circumferential openings using welds 81, 82, 83 . . . (FIG. 3).

Also, in the selection of the position of through holes in the stator core, when the shape of the magnetic steel sheet is polygonal as shown in FIG. 2, it is possible to bore through holes at the corners of the polygons.

Also, in order to improve the heat radiation action in the stator core, as shown in FIG. 2, for instance, by broken lines in only one side, an uneven structure 1F for heat radiation may be arranged at each side portion of laminated core.

Figure 4:
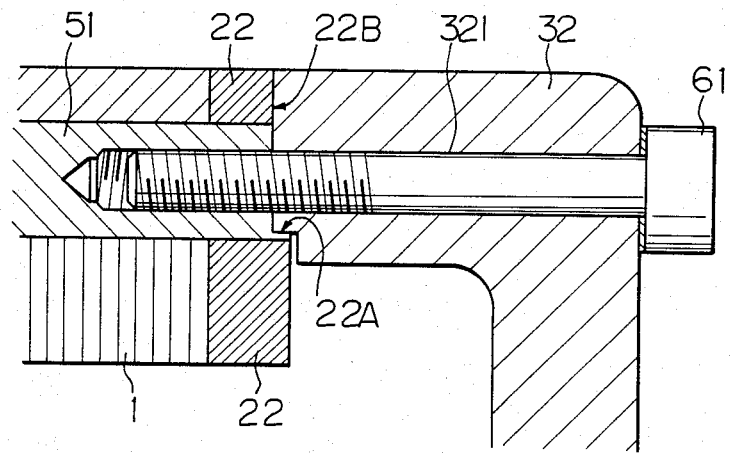
FIGS. 4 and 5 are views of further examples of a structure fixing a stator core, a front bracket, and a rear bracket.
Figure 5:
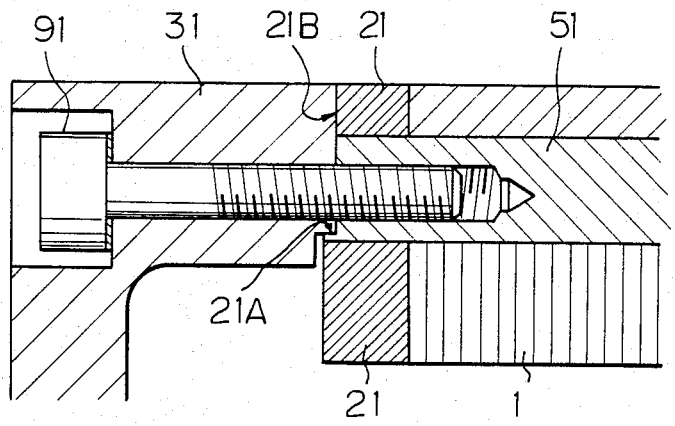

It is to be understood that the foregoing relates to only a preferred embodiment of the invention and that various changes and modifications may be made in the invention. In place of a structure where the stator core is sandwiched between front and rear brackets, as shown in FIG. 4 and FIG. 5, end plates 21 and 22 may be fitted on to the front and rear ends of the stator core, machined fit-structures 21A, 22A and butt-joint structures 21B, 22B may be arranged in order to couple said end plates and said front and rear brackets with the fitting portion of said end plates, said front, and rear bracket to help the positioning for coupling with end plates and front and rear brackets.

We claim:

1. A stator of a motor having a stator core consisting of laminated magnetic core sheets, wherein:

through holes are bored at predetermined positions of the stator core, reinforcing bars are inserted into said through holes along with being fixed to said stator core by welding, said stator core is supported between a front bracket and a rear bracket, and tap bolts penetrate said front bracket and said rear bracket, and are screwed with internal threads at the end of said reinforcing bars, thereby fixing in place said stator core, said front bracket, and said rear bracket.

2. A stator of a motor according to claim 1, wherein end plates are arranged at the end portion of said stator core to form a fitting structure and butt joint structure between said end plates and said front and rear brackets.

3. A stator of a motor according to claim 1, wherein said magnetic core sheets are shaped to form polygons and the positions of said through holes are positioned at the corners of said polygons.

4. A stator of a motor according to claim 1, wherein an uneven structure is formed on the side surface of said stator core to acilitate heat radiation.

* * * * *